United States Patent

[11] 3,607,144

[72] Inventor Roy E. Paul
 Columbia, Tenn.
[21] Appl. No. 724,817
[22] Filed Apr. 29, 1968
[45] Patented Sept. 21, 1971
[73] Assignee Stauffer Chemical Company
 New York, N.Y.

[54] PROCESS OF NODULIZING PHOSPHATE ROCK
 5 Claims, 1 Drawing Fig.
[52] U.S. Cl. .................................................. 23/313,
 23/223, 23/105
[51] Int. Cl. .............................................. C05b 19/00,
 C01b 25/00
[50] Field of Search .......................................... 23/304,
 313, 165, 223, 105

[56] References Cited
 UNITED STATES PATENTS
 1,123,672  1/1915  Borch ......................... 23/313

2,035,845  3/1936  Stanton ....................... 23/313
 3,004,137  10/1961 Karlovitz ..................... 204/64
 3,095,266  6/1963  Lauder et al. ................. 23/313
  OTHER REFERENCES
 Chemical Engineering, October 1951, pages 161–174

Primary Examiner—Norman Yudkoff
Assistant Examiner—S. Silverberg
Attorney—Jaeschke and Goldwasser ABSTRACT: An improved process for manufacturing phosphate nodules from phosphate rock which consists of charging the aggregate phosphate rock into a rotating kiln. The phosphate rock is then heated by a flame that impinges upon the nodules formed at the exit end of the kiln. The improvement consists of using a higher temperature flame at the point of impingement of the flame upon the nodules. This is preferably brought about by adding pure oxygen to the combustionable air mixture.

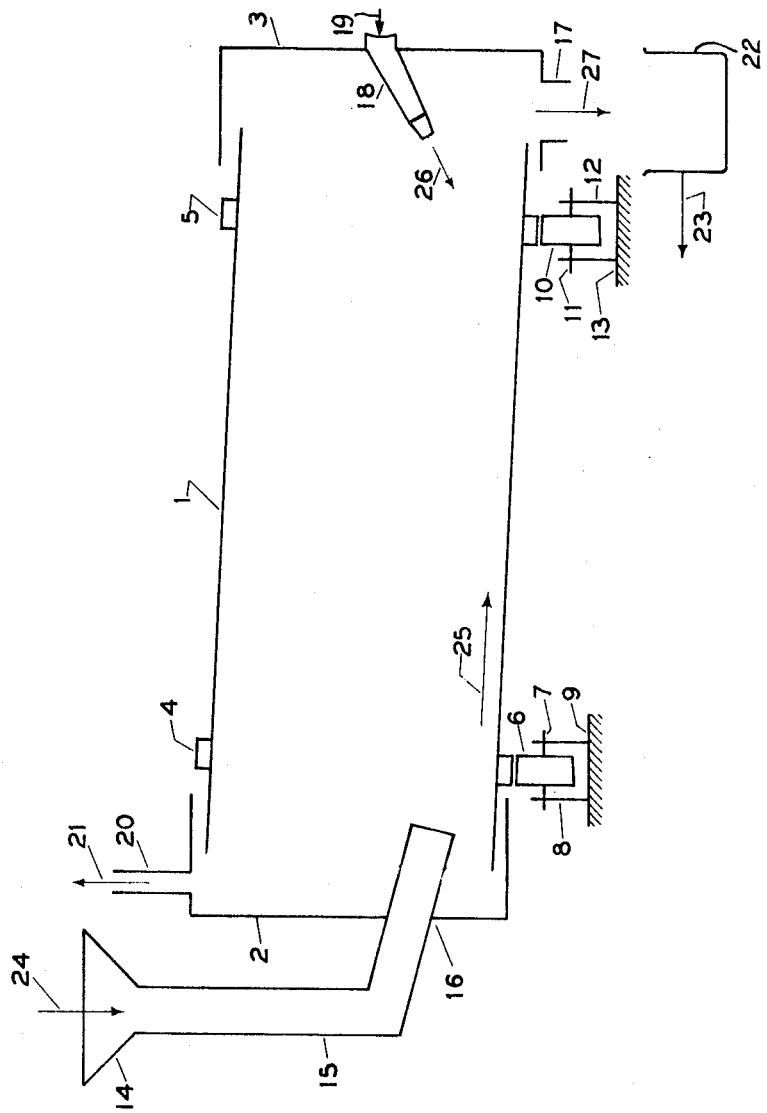

3,607,144

PROCESS OF NODULIZING PHOSPHATE ROCK

BACKGROUND OF THE INVENTION

In the process for recovering phosphorus, it is the practice to obtain a phosphate rock by mining or other conventional procedures. The phosphate rock is conveyed to a mechanism where it is treated to form a furnace grade rock by conventional crushing, grinding, washing, flotation or the like.

Thereafter, the phosphate rock is heat-treated by charging the phosphate rock into an elongated kiln. The kiln is usually cylindrical and mounted on a slight incline and is rotatable. Thus, the charge of phosphate rock is moved toward the discharge portion of the rotating kiln by gravity. A burner mechanism including a high-pressure nozzle is mounted at the discharge end of the kiln. The burner is positioned at an angle with respect to the longitudinal axis of the kiln so that the flame will impinge upon the phosphate rock moving therein. A combustionable fuel and air is intermixed in a conventional manner and fed to the burner for ignition. This treatment of the phosphate rock will cause them to be transformed into a semisolid state which results in fusion of the phosphate rock into an aggregate of phosphate rock nodules. This treatment of the phosphate rock is defined as the nodulization process.

The nodules formed are conveyed to a phosphorus recovery furnace where they are subjected to high temperatures in the presence of a carbon-containing material. This treatment causes the phosphorus to be removed as a gas from the nodules. The phosphorus is then recovered by conventional condensation procedures. The remaining phosphorus free rock or slag is then removed from the furnace. When employing conventional electric arc recovery furnaces, it has been found that the nodules charged thereto should be of a uniform size and a bulk density of above 70 lbs./ft.$^3$ Thus, a charge of nodules should be relatively free of a large amount of fines. The presence of these fines will cause choke-ups in the normal operation of the electric arc furnaces.

In practicing the nodulizing process as defined above, it has been found that the size of the nodules produced varies considerably. As is well understood in this art, this problem increases considerably when using a high grade of phosphate rock. Thus, a large amount of fines are produced along with relatively large nodules or "clinks." It is necessary to reduce the size of the larger nodules, which produces additional fines, and it is also necessary to remove the fines and recirculate all of them back into the kiln. This recirculation of fines and size reduction procedure results in a considerable increase in overall production cost.

At the point of impingement of the flame upon the phosphate rock, a coating of fused phosphate rock will build up on the lining of the kiln. Because the heat applied to this area is insufficient, large portions of this coating will fall off in an erratic manner and expose these portions of the brick lining of the kiln to the moving hot nodules. This causes frequent stoppages in operation to replace the lining due to the eroding effect of the nodules. Additionally, the coating that does not fall off will continue to build up and requires a scraping operation to remove it. The recovery time to regain normal operations after the scraping operation is inordinately long. The result of the downtime due to these stoppages also results in increased production cost.

BRIEF DESCRIPTION OF THE INVENTION

It has been discovered that the fines produced during normal operation of nodulizing the phosphate rock can be substantially reduced. This is brought about by admixing pure oxygen with the air-fuel mixture, that is conveyed to the burners for combustion. With the addition of the oxygen to the air-fuel mixture, the flame temperature produced by combustion will be substantially increased. The impingement of this higher temperature flame upon the phosphate rock produces a considerably more uniform size distribution in the nodules that are recovered. This improvement in nodule size distribution substantially reduces the amount of fines that are required to be recirculated for nodulization. Moreover, the capacity of the kiln is increased due to the higher temperature or heat input to the nodules which necessarily results in decreased fuel requirements per unit weight of nodules processed. Additionally, the life of the linings on the inside of the kiln is materially increased due to improved heat control with the use of oxygen.

BRIEF DESCRIPTION OF THE DRAWING

The single FIGURE is a schematic illustration of a kiln for nodulizing phosphate rock.

DETAILED DESCRIPTION OF THE INVENTION

In the practice of the present invention, the aggregate phosphate rock is introduced into a hopper 14 as indicated by the arrow 24. The phosphate rock falls by gravity through a pipe or other conveying means 15 which extends into the kiln 1 through an opening 16, through enclosure number 2.

The kiln 1 is mounted for rotation on roller members 6 and 10 that are mounted on axles 7 and 11 respectively. The members 6 and 10 engage the kiln 1 on tracks 4 and 5. Yoke members 8 and 12 support axles 7 and 11 and are rigidly supported as indicated at 9 and 13. The kiln 1 is rotated in a conventional manner.

The phosphate rock that is introduced into the kiln 1 moves to the exit end by gravity as indicated by the arrow 25. As the phosphate rock moves towards enclosure member 3, a flame from a nozzle 18 is impinged thereon as indicated by the arrow 26. The nozzle 18 is fed or provided with a combustionable fuel consisting of a mixture of the fuel, air and pure oxygen. After the nodules are formed, they fall through an opening 17 as indicated by arrow 27 into a receptacle or other conveyor means 22 and continuously removed as indicated by arrow 23.

During the heat treatment of the phosphate rock to form the nodules, gas is removed from the phosphate rock. These gases have been identified as fluorine, sulfur dioxide, silica gases, and dust. It is necessary to remove these gases from the kiln 1 along with the gases of combustion. Of course, nitrogen is also given off due to the presence or use of air during the combustion procedure. These gases are removed by the stack 20 and conveyed through a tube or other means indicated at 21 to a scrubber mechanism.

As is well understood in this art, these effluent gases are scrubbed with water or other solvents and are otherwise removed. Thus, the fluid within the scrubber mechanism is highly acidic. These acids that are formed must be neutralized prior to removing them. Therefore, it is required that neutralizing salts be added thereto. It has been found in practice that the pH of the fluid within the scrubber mechanism will vary between about 3.5 and 11.5. However, it has been found that this pH will vary between about 5.5 and 8.5, when oxygen is used to enrich the components of combustion within the burner mechanism. This unexpected degree of control over the pH of the fluid within the scrubber mechanism is not fully understood. However, it is theorized that by the use of pure oxygen which increases the flame temperature, there is provided a more constant removal of the gases within the nodules themselves. Thus, a higher degree of control can be maintained in neutralizing the acids formed within the scrubber mechanism.

It has been found in practice that the amount of oxygen that must be added to the combustionable fuel intermixture can range up to about 20 percent by volume of the oxygen required for complete combustion, preferably between about 1 and 15 percent. In general, the upper limit of oxygen that can be introduced into the combustionable fuel-air mixture will be limited by temperature considerations within the kiln itself. Since the flame temperature will be about 3,200° F. for an oil-air fuel and up to about 3,500° F. for a natural gas-air fuel, the amount of oxygen added should not exceed that amount necessary to raise the flame temperature above 5,000° F. This temperature is measured at the point of impingement of the flame onto the material being treated. The temperature of the flame employed cannot be in excess of the melting temperature of the phosphate rock. If this temperature is exceeded, the nodules will not be formed.

By employing the pure oxygen as noted above, the nodules so formed will be of a more uniform size and have a higher bulk density than the nodules formed without the use of pure oxygen. In general, the bulk density of the nodules formed without using oxygen will range between 55 and 60 pounds per cubic foot. However, with the use of pure oxygen in the combustionable fuel air mixture, the temperature of the flame is increased which provides a bulk density of between 70 and 74 pounds per cubic foot. When employing nodules of higher bulk density and subsequently introducing them into the electric arc phosphorus recovery furnace, the efficiency thereof is considerably increased. This higher bulk density is clearly an unexpected advantage due to the use of pure oxygen.

In order to illustrate the merits of this invention, the following examples are provided:

EXAMPLE 1

Aggregate phosphate rock was fed into a nodulizing kiln over a period of several days with a daily record recorded of the operation of the kiln. The nodulizing process was the conventional type wherein a flame was impinged upon the nodules at the exit end of the kiln without the use of pure oxygen therewith. Thereafter, the data recorded was averaged to provide overall data for the standard of operation. Thereafter, pure oxygen was added to the combustionable fuel air mixture for several days and recorded. The data was then averaged as a comparative test. The results of this run are tabulated below:

TABLE 1.—NODULIZING DATA

| Ave. tons produced per day | Ave. down time per day | Ave. hours of operation per day | Ave. gal. of oil used | Ave. gal. of oil per ton produced | Average oxygen used percent by volume |
| --- | --- | --- | --- | --- | --- |
| 391 | 4 hours, 40 minutes. | 19.25 | 4,100 | 10.5 | 0 |
| 551 | 27 minutes | 23.5 | 4,286 | 7.8 | 3 |

EXAMPLE 2

During the operation of the kiln as noted in Example 1, the pH value of the acids formed in the conventional scrubber mechanism was noted. Thus, the pH ranged between 3.5 and 11.5 when nodules were formed without the use of oxygen while the pH ranged between 5.5 and 8.5 with the use of oxygen.

EXAMPLE 3

During the operation of the kiln in obtaining data in accordance with Example 1, a large or thick scale of melted phosphate rock was required to be scraped off at the exit end of the kiln where the flame impinged upon the nodules. When manufacturing the nodules without the use of oxygen, the recovery times to regain normal operations after a scraping operation were from 20 to 27 minutes. However, the recovery time after a scraping operation with the use of pure oxygen within the combustionable fuel-air mixture was between 3 and 5 minutes.

EXAMPLE 4

During the operation of the kiln to obtain data in Example 1, the bulk density of the nodules was measured without the use of oxygen and found to average about 57 pounds per cubic foot. However, with the use of pure oxygen with the combustionable fuel air mixture, the average bulk density was about 74 pounds per cubic foot. Moreover, the amount of fines that were required to be recirculated back into the kiln for processing reduced by about 35 percent when using pure oxygen.

As can be seen from the above data, the use of pure oxygen clearly enhances the manufacture of nodules in accordance with the present invention. While the present invention has been described in the use of pure oxygen to increase the flame temperature of the kiln, it is to be understood that other procedures to increase the flame temperature are readily usable with the present invention. The other methods of increasing the temperature that can be used are electrically augmented flames which are produced in a particularly designed burner such as that described in U.S. Pat. No. 3,004,137 Basically, the burners described produce a high temperature flame by employing combustionable fuel air mixtures that are enriched with pure oxygen and an electrical discharge distributed across the flames.

What is claimed is:

1. In a process for manufacturing phosphate nodules from aggregate phosphate rock which consists of charging a rotating kiln with the phosphate rock; heating the phosphate rock during its travel within the kiln; and impinging a flame upon the phosphate rock to form the nodules at the exit end of the kiln; the improvement which comprises employing a flame temperature at least above 3,500° F. and below about 5,000° F. as the flame of nodulizing.

2. The process as set forth in claim 1, wherein the flames of nodulization are increased by the use of pure oxygen.

3. The process as set forth in claim 2, wherein the amount of oxygen added can range up to about 20 percent by volume of the oxygen required for complete combustion.

4. The process as set forth in claim 3, wherein the amount of oxygen added can range between about 1 and 15 percent by volume of the oxygen required for complete combustion.

5. The process as set forth in claim 1, wherein the flame temperature is increased by electrical augmentation.